(12) United States Patent
Rooney (10) Patent No.: US 8,653,682 B2
(45) Date of Patent: Feb. 18, 2014

(54) OFFSHORE HYDROELECTRIC TURBINE ASSEMBLY AND METHOD

(76) Inventor: Thomas Rooney, Big Canoe, GA (US)

( * ) Notice: Subject to any disclaimer, the term of this patent is extended or adjusted under 35 U.S.C. 154(b) by 139 days.

(21) Appl. No.: 13/444,113

(22) Filed: Apr. 11, 2012

(65) Prior Publication Data

US 2012/0257955 A1 Oct. 11, 2012

Related U.S. Application Data (63) Continuation-in-part of application No. 12/891,241, filed on Sep. 27, 2010, now Pat. No. 8,558,403.

(51) Int. Cl.
*F03B 13/00* (2006.01)
*F03B 13/10* (2006.01)
*H02P 9/04* (2006.01)

(52) U.S. Cl.
USPC .............................................. 290/43; 290/54

(58) Field of Classification Search
USPC ........................................................ 290/43, 54
See application file for complete search history.

(56) References Cited

U.S. PATENT DOCUMENTS

| | | | | |
|---|---|---|---|---|
| 2,501,696 A * | 3/1950 | Souczek | .......................... | 290/43 |
| 4,383,182 A * | 5/1983 | Bowley | ........................... | 290/43 |
| 4,850,190 A | 7/1989 | Pitts | ................................ | 60/398 |
| 6,091,161 A * | 7/2000 | Dehlsen et al. | ................. | 290/43 |
| 6,531,788 B2 | 3/2003 | Robson | .......................... | 290/43 |
| 6,856,036 B2 | 2/2005 | Bilinsky | .......................... | 290/42 |
| 7,291,936 B1 | 11/2007 | Robson | .......................... | 290/43 |
| 7,352,078 B2 | 4/2008 | Gehring | .......................... | 290/34 |
| 7,441,988 B2 * | 10/2008 | Manchester | .................... | 405/75 |
| 7,470,086 B2 | 12/2008 | Jennings | .......................... | 405/76 |
| 7,471,006 B2 * | 12/2008 | Janca et al. | ..................... | 290/43 |
| 7,489,046 B2 * | 2/2009 | Costin | .............................. | 290/43 |
| 7,492,054 B2 * | 2/2009 | Catlin | .............................. | 290/54 |
| 7,541,688 B2 * | 6/2009 | Mackie | ............................ | 290/54 |
| 7,649,275 B2 * | 1/2010 | Janca et al. | ..................... | 290/43 |
| 7,682,126 B2 * | 3/2010 | Parker | ........................... | 415/3.1 |
| 7,737,570 B2 * | 6/2010 | Costin | .............................. | 290/43 |
| 7,851,936 B2 * | 12/2010 | Bolin | ................................ | 290/54 |
| 7,939,957 B2 * | 5/2011 | Costin | .............................. | 290/54 |
| 8,102,071 B2 * | 1/2012 | Catlin | .............................. | 290/54 |
| 8,188,613 B2 * | 5/2012 | Lee | ................................... | 290/54 |
| 8,193,656 B2 * | 6/2012 | Che | ................................... | 290/54 |
| 8,288,882 B2 * | 10/2012 | Bolin | .............................. | 290/54 |
| 8,350,396 B2 * | 1/2013 | Dempster | ...................... | 290/43 |
| 2005/0121917 A1 | 6/2005 | Kikuchi | .......................... | 290/53 |
| 2006/0280034 A1 * | 12/2006 | Howard et al. | ................ | 367/134 |
| 2007/0096472 A1 * | 5/2007 | Mondl | ............................. | 290/54 |
| 2007/0231072 A1 * | 10/2007 | Jennings et al. | ................ | 405/75 |

(Continued)

*Primary Examiner* — Pedro J Cuevas
(74) *Attorney, Agent, or Firm* — Allen, Dyer, Doppelt, Milbrath & Gilchrist, P.A.

(57) ABSTRACT

The invention is directed to a single moored offshore marine turbine assembly having a central control vessel which includes a main vessel tethered to a control buoy. The main vessel having a first cap, a corresponding second cap and a tubular shell positioned between both the first cap and second cap. The tubular shell contains one or more vertical partitions to assist in ballasting. The control buoy includes a compressor and an air conduit which forces air into the main vessel through a manifold. A hollow suction caisson affixes the central control vessel to the ocean floor. A taut line mooring secures the suction caisson to the main vessel. Electricity is generated via a turbine shroud assembly having a conical shroud and a hydro-turbine. By attaching a plurality of turbine shroud assemblies in series via cables, a horizontal turbine array is formed resulting in a simple, economical and safe layout.

17 Claims, 5 Drawing Sheets

(56) References Cited

U.S. PATENT DOCUMENTS

| | | | |
|---|---|---|---|
| 2007/0257492 A1* | 11/2007 | Robson | 290/54 |
| 2007/0284882 A1* | 12/2007 | Costin | 290/43 |
| 2008/0296899 A1* | 12/2008 | Janca et al. | 290/54 |
| 2009/0072542 A1* | 3/2009 | Janca et al. | 290/54 |
| 2009/0091135 A1 | 4/2009 | Janca | 290/54 |
| 2009/0167022 A1* | 7/2009 | Costin | 290/54 |
| 2010/0007148 A1 | 1/2010 | Davis | 290/54 |
| 2010/0045043 A1 | 2/2010 | Gostner | 290/52 |
| 2010/0066089 A1 | 3/2010 | Best et al. | 290/52 |
| 2010/0074750 A1 | 3/2010 | Henriksen | 416/85 |
| 2010/0127499 A1 | 5/2010 | Anderson | 290/52 |
| 2010/0148512 A1 | 6/2010 | Pitre | 290/54 |
| 2010/0237625 A1* | 9/2010 | Dempster | 290/54 |
| 2010/0253078 A1* | 10/2010 | Costin | 290/43 |

* cited by examiner

OFFSHORE HYDROELECTRIC TURBINE ASSEMBLY AND METHOD

CROSS-REFERENCE TO RELATED APPLICATION

This is a Continuation in Part Application of U.S. patent application Ser. No. 12/891,241 filed on Sep. 27, 2010 now U.S. Pat. No. 8,558,403 entitled "Single Moored Offshore Horizontal Turbine Train," which is incorporated by reference herein.

FIELD OF THE INVENTION

The invention is directed to a tethered array of hydroelectric turbines and related methods designed to harness kinetic energy from water currents.

BACKGROUND OF THE INVENTION

With the continued rise in fossil fuel costs and associated risks in acquiring such fuels, a large number of alternative energy solutions have recently risen in popularity. Such alternative energy solutions not only decrease dependence upon foreign countries to supply energy to the United States, but also serve to decrease the carbon footprint and reverse the effects of global warming. Additionally, such sustainable alternative solutions reduce the price of energy in the long-term.

Hydroelectric energy, which uses the kinetic motion of water as a source of energy is a viable and sustainable alternative power source. Not all forms of hydroelectric power generation, such as the use of dams, are desirable due to environmental concerns. Despite the ability to harness wave power as a second hydroelectric energy power generation scheme, many have criticized wave power because these systems obstruct the coastal shore. This has lead to increased research into the third most common form of hydroelectric energy: obtaining kinetic energy from the deep water currents found in oceans and waterways.

There exist several pilot programs of current farms within the United States. This includes a project in the East River in New York, as well as certain tidal projects planned in San Francisco Bay and Puget Sound, among others. However, all of these locations afford limited sources of deep water currents, while posing significant risks to ship and recreational watercraft traffic entering these large metropolitan waterways.

The Gulf Stream, located within the waters of the Southeast coast of the United States, affords some of the largest and most powerful ocean currents in the world for purposes of electricity generation. For example there exists a three knot current approximately 20 miles wide off of Jupiter Inlet, Fla. This source of kinetic energy remains virtually untapped- with limited plans for developing any technology to harness this alternative energy source. This is largely attributed to the fact that while several means have been created to harvest ocean currents, few have been found to be viable.

Accordingly, there is a need in the art of hydro-turbine assembly design for harnessing current-based power for improved functionality so to allow more efficient energy generation and more accurate regulation of the depth of turbine assemblies to maximize contact with water currents within a large body of water such as the ocean, rivers, or other waterways. Such a design should rely upon limited use of moorings and related attachments to the waterbody floor. Moreover, such design should maximize placement of various hydro-turbines in a manner that allows improved access for maintenance, lowered turbulence, and maximal energy production.

SUMMARY OF THE INVENTION

The present invention solves many of the shortcomings found the current design of hydroelectric systems used to harness water currents. The invention teaches a system for harnessing the current energy of water bodies to generate electricity via a prefabricated, scalable, and cost-effective hydroelectric turbine assembly.

The invention contemplates a hydroelectric turbine assembly, comprising an anchoring point secured to a floor of a body of water. A central control vessel having controllable buoyancy is secured to a mooring line which is secured to the anchoring point. A plurality of turbine cables attached to the control vessel stabilizes a turbine array. The turbine assembly comprises a plurality of serially arranged turbines in communication with the turbine cables. A means to control the buoyancy of the control vessel so to control the depth of the control vessel in a body of water and the depth of the turbine array to position the array in the optimal current is also contemplated by the invention.

A method of generating electricity using this embodiment of the hydroelectric turbine assembly is also contemplated by the invention.

In one embodiment of the hydroelectric turbine assembly, an anchoring point is secured to a floor of an ocean wherein a central control vessel having controllable buoyancy is fixedly secured to a mooring line which is attached to the anchoring point. At least 3 turbine cables are attached to the control vessel for the purpose of stabilizing an inline turbine array. The turbine cables form a substantially rigid structure when subjected to the ocean's current. A plurality of serially arranged turbines in communication with the turbine cables, and the turbine cables maintain the turbines at an angle substantially normal to the direction of the ocean's hydraulic current so to minimize yaw and maximize turbine power. The assembly comprises a means to control the buoyancy of the control vessel so to control the depth of the control vessel in a body of water. Therefore, the depth of the turbine assembly and the turbine cables of the assembly maintain about the same depth of the turbine array, to position the array in the optimal current.

A method of generating electricity using this embodiment of the hydroelectric turbine array is also contemplated by the invention.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overall Components of the Turbine Assembly

Figure 1:
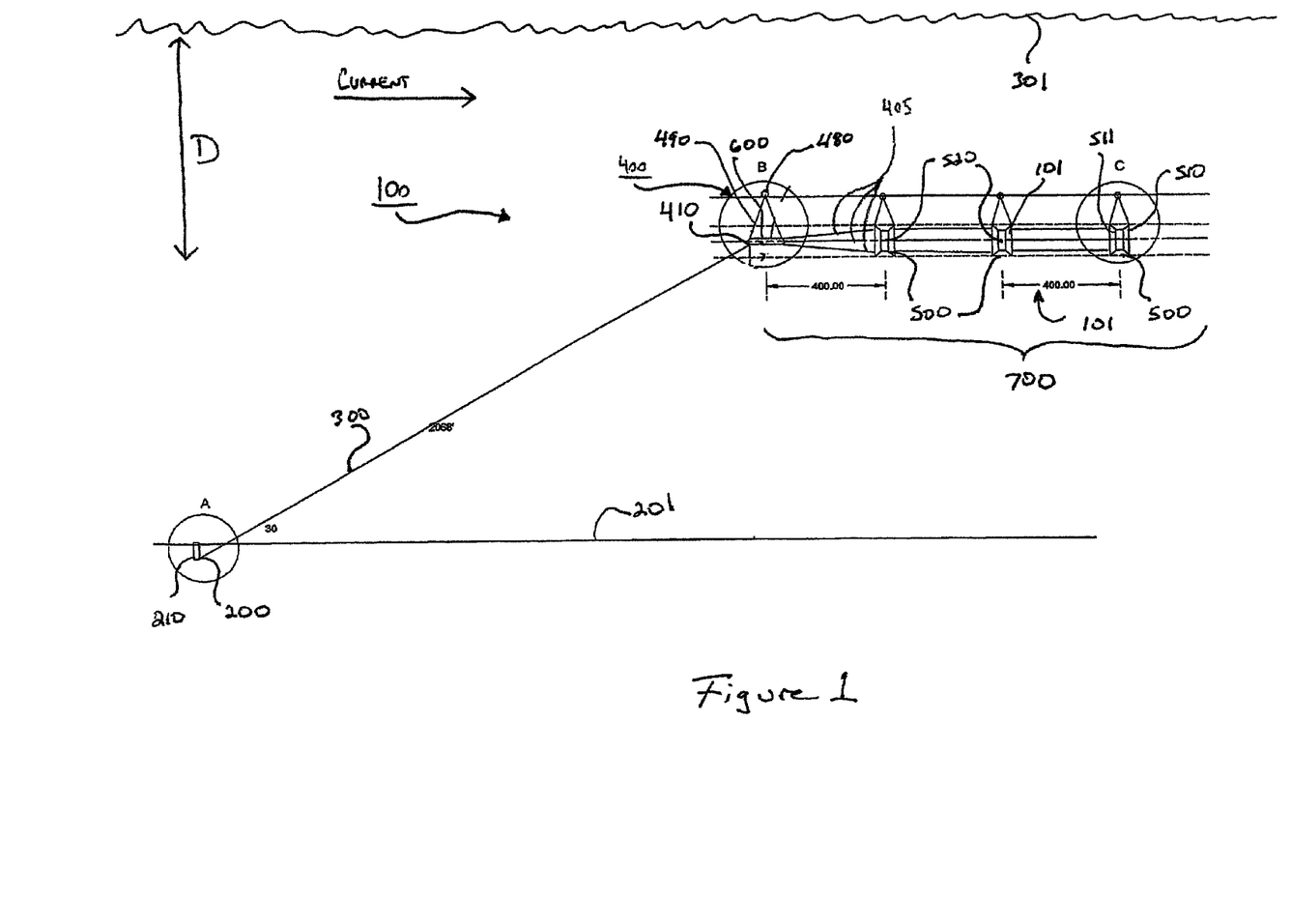
FIG. 1 is a front view illustrating the turbine assembly including use of the central control vessel.

FIG. 1 illustrates, by way of example, the preferred components 101 of an assembly 100 used to harness the kinetic energy of deep water currents (which can be drawn from the ocean, rivers, or other waterways). As shown, the assembly 100 preferably includes an anchoring point 200, a mooring line 300, and a central control vessel 400 attached to the anchoring point 200 via the mooring line 300. A plurality of turbine shrouds 500 (each comprising at least one hydro-turbine 520) are placed in series with one another. Each turbine shroud 500 forms part of an electric collection system 600 to generate and supply electricity. Such a system effectively creates a single moored assembly 100 where there are multiple hydro-turbines 520 horizontally positioned to form a turbine array 700 located below the surface of the water 301. While FIG. 1 illustrates one manner of arranging the turbine array 700, one of ordinary skill in the art upon having the benefit of the teachings of the present invention, will recognize and appreciate other related embodiments for the assembly 100.

As further shown in FIG. 1, the invention calls for a foundation 210 in the form of an anchoring point 200 capable of securing the various components 101 of the turbine assembly to the ocean floor 201. As soil conditions within the ocean floor 201 vary greatly, such an anchoring point 200 must be designed to cut through various soft layers of silty clay as well as dense sand located below the ocean floor 201. This foundation 210 must also contemplate seismic events common along the ocean floor 201, which may risk dislodging the assembly 100 if not properly moored. Besides traditional suction caissons, a driven pile or a suction embedded plate anchor (SEPLA) mooring system can be embedded in the ocean floor 201 as the an anchoring point 200.

Positioned between the anchoring point 200 and the central vessel 400 is a mooring line 300. The mooring line 300 (which is preferably a taut mooring line) is rigidly affixed to the anchoring point 200 and has a sufficient length to position the central vessel 400 at a predetermined depth (D) below the ocean surface 301 to maximize contact with water currents. Such mooring line 300 is preferably made of a resilient high-tension material that is non-corroding such as ultra high molecular weight polyethylene, Dyneema®, Spectra®, Nylon®, Twaron®, Vectran®, Technora®, and combinations thereof. Due to greater buoyancy and lower weight of such synthetic line materials, as compared to metallic lines, catenary curvature of the mooring line 300 is minimized or eliminated altogether.

Further shown in FIG. 1, a key feature of the assembly 100 is the central control vessel 400 used to regulate the correct position of the various turbine shroud systems 500 below the ocean surface 301. While this control vessel 400 may take many forms, the device preferably has a two-part construction having a main vessel 410 in direct communication with a control buoy 480 positioned above the ocean surface 301. An air conduit 490 attached to the control buoy 480 feeds compressed air into the main vessel 410 housing to help regulate height. Preferably, such main vessel 410 is regulated at a position approximately 100 feet below the water surface 210, or any acceptable height such that the assembly 100 is not affected by atmospheric weather conditions (including hurricanes) or the movement of ships and other watercraft.

Affixed to the aft end of the central control vessel 400 is the turbine array 700 comprised of a plurality of horizontally positioned turbine units 500. The turbine units 500 are positioned in linear series so as to reduce the number of mooring systems and to simplify the turbine array 700. While such a turbine array 700 is preferably formed from this series of hydro-turbines 520, the invention also contemplates placement of two hydro-turbines 520 in parallel within a single shroud. The hydro-turbine 520 can range in size and dimension, but is preferably between about 20 to 40 meters in diameter. Selection of the proper turbine unit's 500 size will be based upon typical conditions within the area for placement of the turbine array 700. For example, a 30 meter diameter hydro-turbine 520 and a shroud shell 510 of 51 meters may be used to harness the currents of the Gulf Stream. Each turbine unit 500 is made of a two part construction: a steel shroud shell 510 which is preferably hollow, and a hydro-turbine 520 positioned proximate the shroud shell 510. Such a shroud shell 510 is preferably filled with a buoyant material 511, such as closed cell polystyrene foam (Styrofoam®), to make the overall turbine unit 500 have neutral buoyancy and reduce the risk of sinking.

The Foundation and Mooring Line

Figure 2:
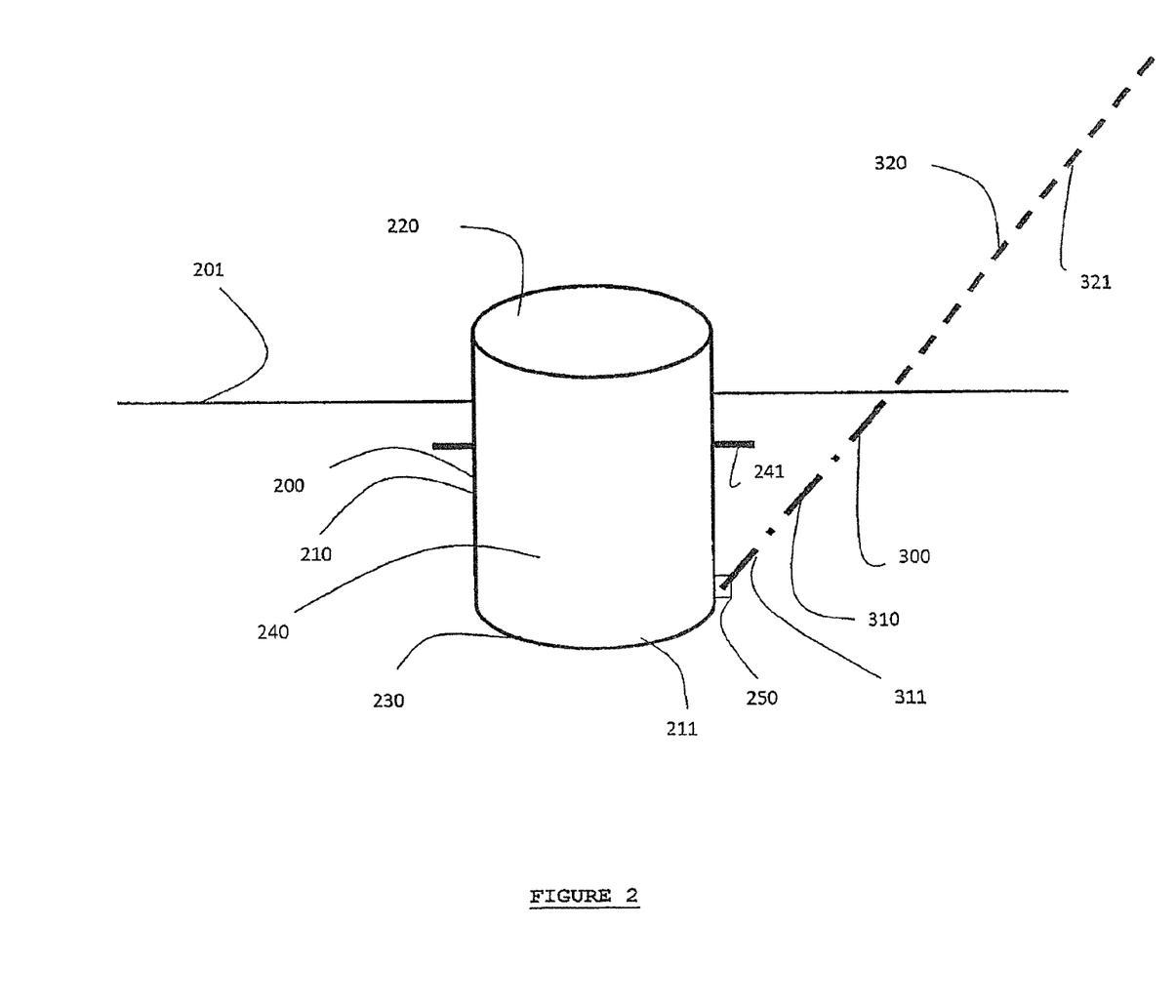
FIG. 2 is a front view showing the various components of the suction caisson.

FIG. 2 offers, by way of example, one embodiment of both the foundation 210 and the single mooring line 300 contemplated for use with the assembly 100. As shown, the foundation 210 is preferably an anchoring point 200 of tubular shape and construction. The anchoring point 200 includes a first end 220, a corresponding second end 230 and a tubular shaft 240. Moreover, such foundation 210 is preferably hollow and made of a strong, heavy, material such as steel.

Preferably, the first end 230 of the anchoring point 200 includes a sharp knife edge 211. In this embodiment, the anchoring point 200 is a suction caisson. This sharp edge 211 in addition to a vacuum created in the anchoring point 200 functions to assist in driving the anchoring point 200 deep into the various soft layers of silty clay and well as dense sand located below the ocean floor 201. Moreover, the tubular shaft 240 may include various perpendicular fins 241 which function to prevent movement or raising of the anchoring point 200 once secured to the ocean floor 201. Although the shape and size of such anchoring point 200 varies depending upon the size of the turbine array 700, it typically has a minimum dimension of a 20 foot diameter and a length of 60 feet.

Located proximate the first end 220 of the anchoring point 200 is a rigid fastener 250. While the fastener 250 can take many forms and may vary in size, it is preferably a large circular structure. The fastener 250 is designed to secure and engage the mooring line 300 to the anchoring point 200. Through affixing the mooring line 300 below the ocean floor 201, its exact location will be determined by the geotechnical design.

As further shown in FIG. 2, the mooring line 300 may include a first portion 310 and corresponding second portion 320. More specifically, the invention contemplates a first portion 310 which directly connects to the fastener 250 and positioned within the ocean floor 201. Such first portion 310 is preferably a metal linked chain 311, but can be any similar design and material which is sufficiently strong and highly resilient. Preferably, such metal link chain 311 has capacity determined by the design.

In addition, the mooring line 300 also includes a second portion 320 which is preferably a high strength synthetic line 321. Such synthetic line 321 connects to the metal link chain 311, as well as with the central control vessel 400 (shown in FIG. 1 and FIG. 3). The mooring line 300 may be of a two part construction to handle the tension forces. The benefit of using synthetic line 321 is that it is neutrally buoyant and the result is a taut line mooring. A taut line mooring reduces line length and the catenary curvature of the mooring line 300 is minimized or eliminated altogether. a long, cumbersome and complicated catenary construction which may result in interference with other turbine arrays. Another benefit of such two-part construction for the mooring line 300 allows the turbine array 700 to be attached to the ocean floor 201 via a single mooring. Installing multiple turbines in a train results in reduced construction and assembly costs for the assembly 100, because the entire train can be preassembled on shore this results in less time necessary to implement the technology.

The Central Control Vessel

Figure 3:
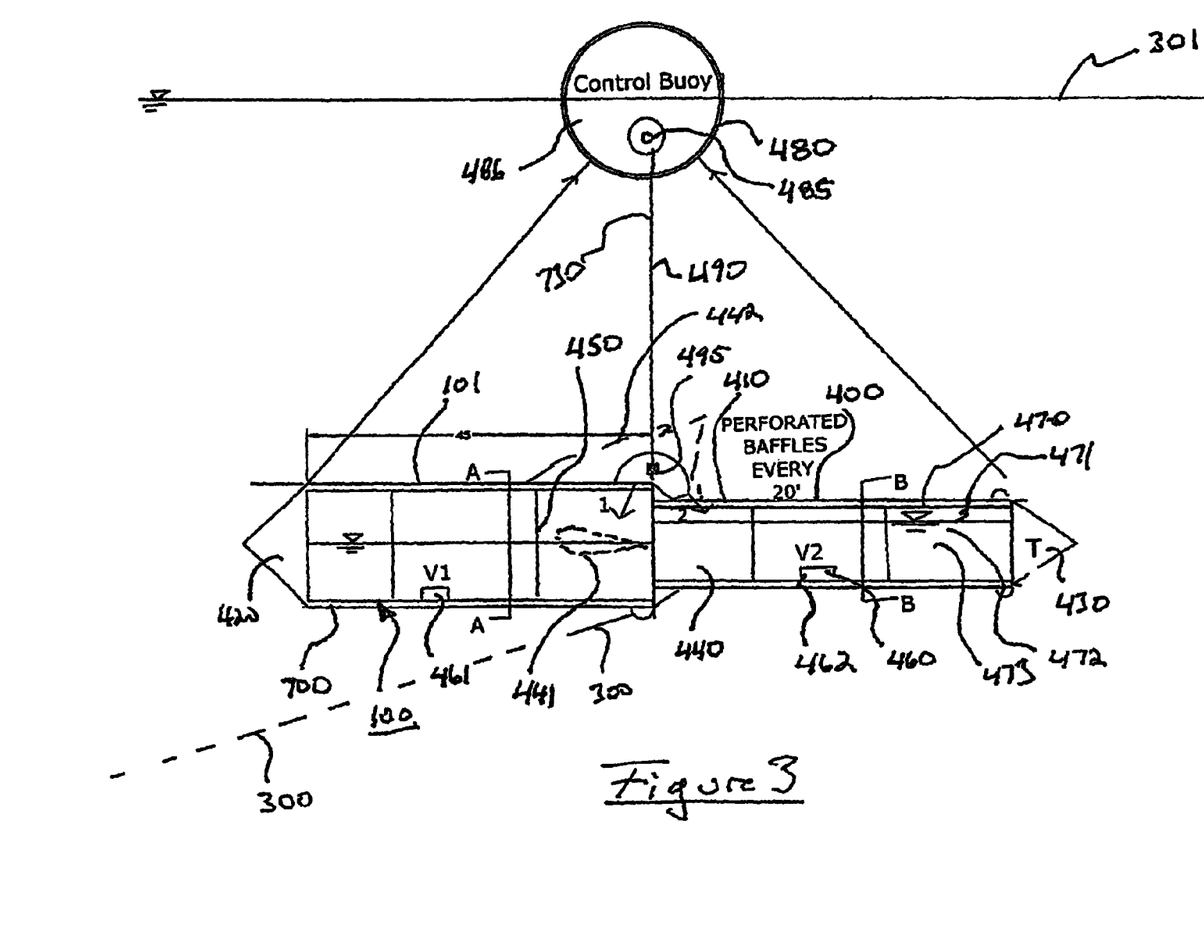
FIG. 3 is a side view showing the various components of the central control vessel.

FIG. 3 illustrates, by way of example, the salient components of the central control vessel 400. The primary function of the central control vessel 400 is to maintain a constant depth below the ocean surface 301 so that the turbine array 700 can maximize use of the strongest water currents. Typically, this requires positioning of the central control vessel 400 some 100 feet below the ocean surface 301. This helps ensure the turbine array 700 remains out of the influence of hurricane wave action, as well as prevents contact with large seafaring vessels. In addition, the control vessel 400 maintains a level attitude minimizing drag forces caused via contact with the water currents. This method is a much more positive way of assuring depth than only relying on hydrofoil action.

While such central control vessel 400 can take many a form and shape, it is preferably of two-part construction having a main vessel 410 along with a control buoy 480. The main vessel 410 is preferably tubular in shape and circular in cross section. The scale of such main vessel 410 for a 20 meter turbine assembly 520 (FIG. 4) is contemplated at about 120 feet long with a cross sectional diameter of about 24 feet. Moreover, the main vessel 410 can be manufactured of high strength inch steel piping, wherein the walls include 1 foot thick Styrofoam® to offset the weight of the piping to increase buoyancy.

As shown in FIG. 3, the main vessel 410 is essentially tubular in cross section. A step down in size of the vessel offsets the large downward forces created by the mooring line 300. The main vessel 410 can alternatively comprise a tear shape to help assist with hydrodynamics. Regardless whether the main vessel 410 is tubular or tear shaped in construction, it includes a first end cap 420 and a corresponding second end cap 430. Positioned between both caps 420 and 430 is a hard tubular shell 440.

Positioned within the tubular shell 440 of the central control vessel 400 is a plurality of partitions 450 sufficient to provide ballasting. These partitions 450 are perpendicular to (and placed within) the tubular shell 440. Moreover, each partition 450 is essentially parallel to (and placed roughly equidistant to) one another. Preferably, one or more of these partitions 450 are solid and some are perforated. The solid partitions 450 form chambers for ballasting and controlling the attitude of the vessel. The perforated partitions 450 control the speed of movement of the ballast water. The use of these partitions 450 ensures that the main vessel 410 remains in a stationary position below the ocean surface 301 and remains level.

The elevation of the main vessel 410 is aided through use of the control buoy 480 positioned at the ocean surface 301. The control buoy 480 preferably includes three main components: an air conduit 490 which links the control buoy 480 to the main vessel 410, a compressor 485 positioned in the control buoy 480 that helps draw outside air 486 into the air conduit 490, and a manifold 495 positioned on the tubular shell 440 which allows entry of air 486 into the main vessel 410.

Accordingly, the control buoy 480 offers two main functions for the control vessel 400. The first function is a placard to spot the assembly 100 from above the ocean surface 301. The control buoy 480 is painted with a bright and/or reflective material to further assist in locating the device. The ready ability to locate the system in turn allows quick maintenance of the assembly 100, as well as the ability to retrieve individual components 101 for repairs.

The second function of the control buoy 480 includes the ability to force air 485 into the main vessel 410 via a manifold 495. Through the addition of air 485, the main vessel can rise and elevate closer to the ocean surface 301. In comparison, by reducing air 485 through the manifold 495, the main vessel 410 will lower.

A set of valves 460 positioned along the tubular shell 440, to further assist vertical positioning of the main vessel 410. Such set includes a first valve 461 and corresponding second valve 462 which function to remove air 485 (and alternatively add water) to the tubular shell 440. Combination of the compressed air 485 via the manifold 495, placement of vertical partitions 450 within the tubular shell 440 and use of valves 460 all function to position the control vessel 400 at a pre-desired position below the ocean surface 310 to maximize exposure to water currents. The valve system will also move ballast water from the fore and aft compartments to make sure the control vessel 400 stays level. There are two instruments in the control vessel 400 controlling the compressor in the buoy and the valves in the control vessel. One reports level and the other depth and provides the signal to the computer controlling the vessel.

In addition, the tubular shell 440 of the main vessel 410 can include both stability fins 441 and hydro-foil 442 attachments to increase stability and maintain a stable altitude within the water current. The main vessel 410 can also include a computer 470 attached to sensors 471 capable of measuring internal air pressure, outside water pressure, the flow rate of the water current, and water temperature. The computer 470 may include a processor 472 and memory device 473 in order to record this information, as well as relay it to the control buoy 480 for transmission. Such computer 470 can also signal addition or removal of air within the tubular shell 440 to regulate proper elevation and attitude.

Turbine/Shroud Assembly

Figure 4:
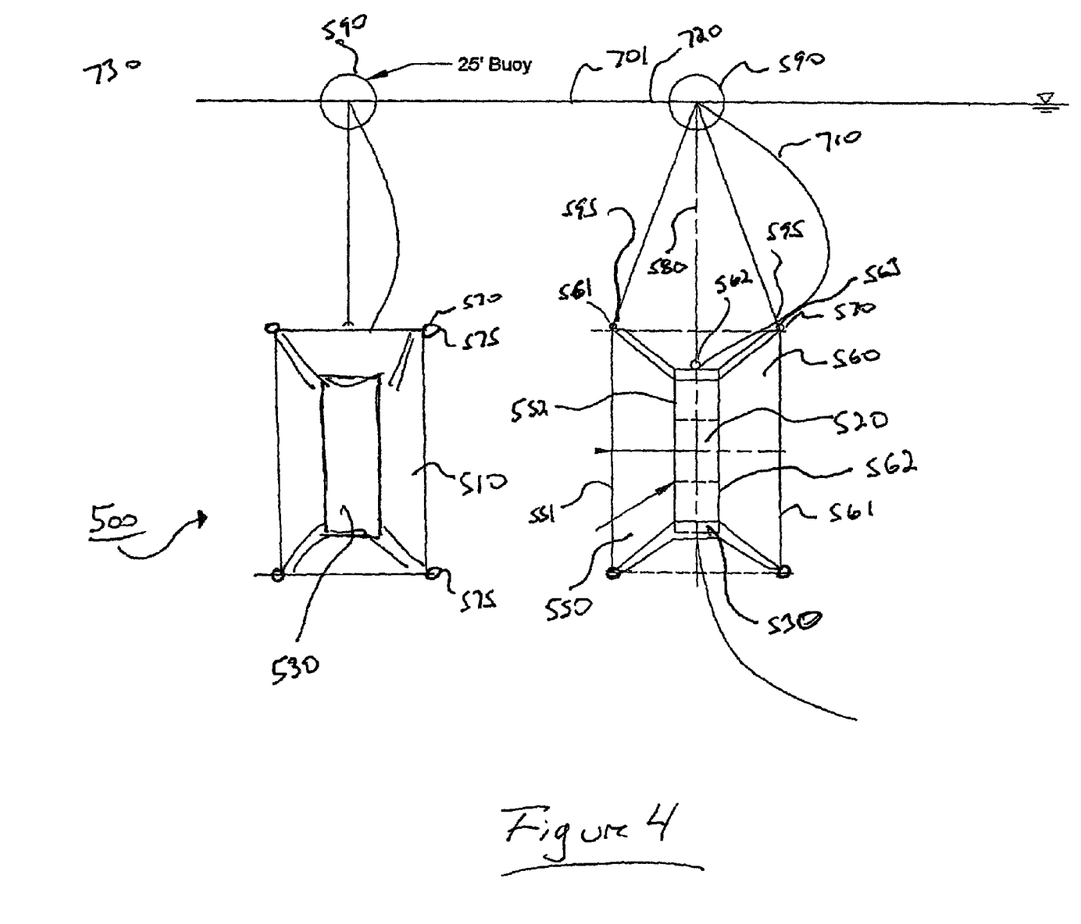
FIG. 4 illustrates how each individual turbine is suspended below the ocean's surface.
Figure 5:
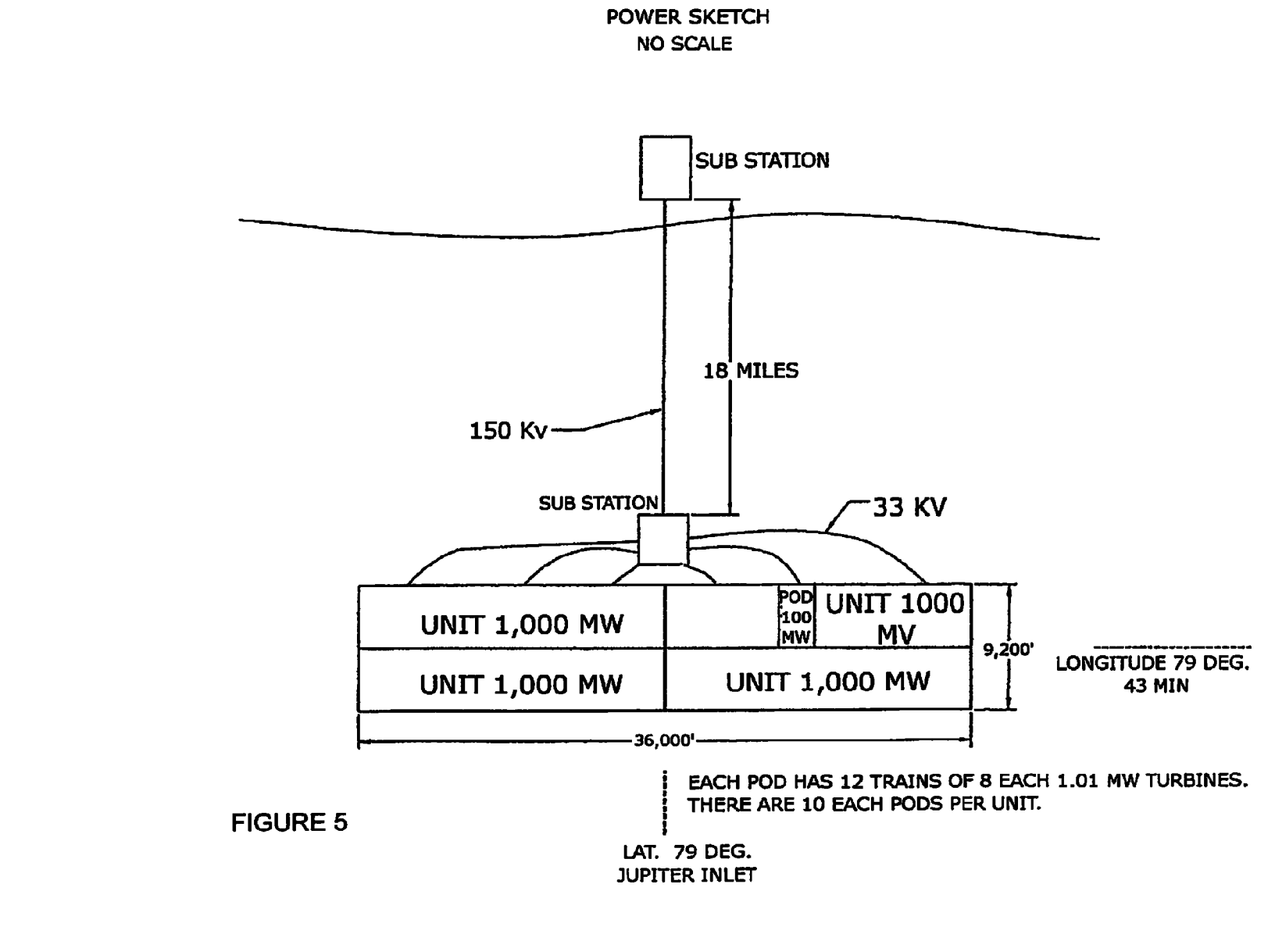
FIG. 5 is a schematic showing the power generation system.

FIG. 4 illustrates, by way of example, one arrangement for the turbine assembly 500. As previously discussed, the turbine assembly 500 comprises two parts: a shroud shell 510 and a hydro-turbine 520. First turning to the shroud shell 510, the device is preferably neutrally buoyant through inclusion of Styrofoam® to offset its steel construction. Although the turbine shroud shell 510 can take many forms, the device includes a cylindrical fastener ring 530 inter-dispersed between two conical portions 540.

The first conical portion 550 includes an outer opening 551 and an interior edge 552. The outer opening 551 has a diameter greater than the interior edge 552. Moreover, the interior edge 552 connects with the fastener ring 530 which maintains a hydro-turbine 520. Through this construction, currents are directed through the first conical portion 550 into the hydro-turbine 520.

In comparison, the second conical portion 560 shape mirrors the first conical portion 550. More specifically, the second conical shape has an outer opening 561 and an interior edge 562. Again, the interior edge 552 has a diameter less than the outer opening 561. Such interior edge 552 again connects with the fastener ring 530. Such design allows current to be directed out and away from the hydro turbine 520 and materially improves overall hydro-turbine 520 efficiency.

As further shown in FIG. 4, the turbine assembly 500 preferably includes four connectors 570 on the four corners on the turbine assembly 500. These four connectors 570 position the four main turbine cables 405 coming from the central control vessel 400. The high tension in these four cables 405 caused by the large drag forces is what holds the several turbine assemblies 500 in position at 100 feet below the ocean surface 301. There need not only be four connectors 570, but rather the number of connectors 570 and corresponding main turbine cables 405 can be more or less. The cables 405 are preferably made of non-corroding metal, but resilient high-tension rope material that is non-corroding such as ultra high molecular weight polyethylene, polyester, Dyneema®, Spectra®, Nylon®, Twaron®, Vectran®, Technora®, combinations thereof, and any other synthetic rope known in the art may be used as cables 405.

The turbine array 700 relies on the control vessel 400 to maintain depth. The large drag force on each hydro-turbine 520 will control its orientation. The large drag force also forces the main turbine cables 405 to form a substantially rigid structure as a result of the current. The fifth connector is required when the hydro-turbine 520 is to be removed from the turbine assemblies 500 for maintenance or replacement. That fifth connector is connected to the turbine assemblies 500 buoy by cable. There is also a threading cable with a restraining ball at the bottom of the hydro-turbine 520. When a derrick uninstalls a turbine for replacement, it maintains the location of the shroud through the restraining ball.

Another result of the main turbine cables 405 and turbines 520 being subjected to a large hydraulic current force is that the turbines 520 will maintain a substantially normal orientation in relation to the direction of current flow, thus stabilizing the entire turbine array 700. A stabilized and normally oriented turbine 520 is in a position to produce power at substantially maximum efficiency.

As shown and illustrated, there are preferably three top connectors 570: a first connector 561 positioned at the outer opening 551 of the first conical portion 550, a second connector 562 positioned on the top of the fastener ring 530, and a third connector 563 placed on the outer opening 562 of the second conical portion 560. Each connector 570 is attached to a cable 580, which in turn is connected to a positioning buoy 590.

Such positioning buoy 590 preferably is painted a bright and/or reflective color to allow easy location of each hydro-turbine 520 should there be a need for repair or maintenance. Moreover a system of pulleys 595 can be used to regulate each cable 580 to lower or raise the turbine assemblies 500 about the ocean surface 301. Accordingly, these pulleys 595 can let out (or alternatively draw in) a sufficient amount of cable 580 in order to maintain the turbine assembles 500 at approximately 100 feet below the ocean surface 301. In addition, such pulleys 595 can be used to tilt the turbine shroud 500 to maximize contact with the current.

One issue faced by the assembly 100 is the risk of torsion/rotation of the turbine array 700 which may develop during the slow rotation of the individual hydro-turbines 520. These rotational forces are especially prevalent when combining the rotation of each individual hydro-turbine 520 when the turbine array 700 is formed with multiple individual turbine units 500. The invention contemplates several design features to counter the occurrence of these rotation forces. First, the cavity within the shroud shell 510 can be filled with ballast in the form of seawater, or compressed air supplied by a compressor located in the turbine shroud assembly buoy to redistribute the weight of the turbine shroud 500 assembly. Second, a partial ballast system can be placed within the shroud shell 510 including the addition of ballast (such as lead weights). Third, the orientation of each of the individual hydro-turbines 520 can be alternated (such that one turbine propeller rotates clockwise while a second, downstream turbine propeller, rotates counterclockwise) to not only lower rotational forces upon the turbine array 700, but also adds stability to the entire turbine array 700. As a fourth option, a keel can be placed at the bottom of each turbine unit 500 to provide additional stability. In another embodiment, each turbine unit 500 comprises two propellers, the direction of the propeller rotations being contrarotary to each other. The propellers share the same rotational axis, but are offset, one behind the other, and rotate in opposite directions. This helps to minimize the rotational forces that would otherwise act upon the turbine array 700.

Combination of the positioning buoy 590, cables 580 and system of pulleys 595 also help address torsion caused rotation of the hydro-turbine 520 positioned within the fastener ring 530. More specifically, assuming the hydro-turbine 520 rotates at a rate of nine PRM, the cables 580 and positioning buoy 590 function to stabilize the turbine unit 500. This is especially important as any sheering or twisting of an individual turbine unit 500 can potentially damage the entire turbine array 700.

The outer opening 551 of the first conical portion 550 also include four additional side connectors 575. These side connectors 575 are affixed to cables 580 which affix to either the main vessel 410 or alternatively the outer opening 561 of a second conical portion 560 of another turbine shroud 500. Thus the cables 580 allow attachment of a series of turbine shrouds 500 to form the horizontal turbine array 700.

Electric Collection System

In addition to FIGS. 1 through 4, FIG. 5 provides a general illustration of the overall electric collection 600. The electric collection system 600 functions to harness the kinetic energy of the water currents to generate and ultimately transfer electricity for use on-shore. First turning to FIG. 4, electricity 701 is generated by the hydro-turbine 520 positioned within each turbine unit 500. A first feed line 710 emanates from the hydro-turbine 520 along the main cables from the central control vessel 400 to the turbine unit 500 and communicates with a transformer 740 in the aft compartment of the central control vessel 400. While such cables may run along the various buoys, it is preferably that they run along the turbine units 500, to position the various cables below the ocean surface 201 to reduce the risk of tangling with ocean going vessels or risk of breakage caused by weather conditions such as hurricanes. From the control vessel transformer 740 the electricity 701 transfers to a wave hub connector and then to a subsea transformer station. The subsea power transfers to the shore and a landside switching station and into a grid.

Apart from the transport of electrical power from the sub station on the ocean floor (FIG. 5) to the substation on shore by a subsea cable, there are two other methods of storage and movement of the power. Both methods include a power line from the subsea substation to a ship tethered with vacuum caissons directly above the subsea substation. In one method that ship would be a hydrogen production ship which would transform the power into hydrogen. Other hydrogen transport ships would periodically come alongside and load hydrogen and transport it to a hydrogen unloading facility on shore. The second method would be to store the power as power in a battery or capacitor type storage facility either on the ocean floor or in a tethered ship and have another battery ship periodically move the power to shore.

That which is claimed is:

1. A hydroelectric turbine assembly, comprising:
   an anchoring point secured to a floor of a body of water having a current flow;
   a central control vessel having means for controlling buoyancy;
   a mooring line fixed to the control vessel, wherein the mooring line secured to the anchoring point;
   a turbine array comprising a plurality of serially arranged turbines;
   a plurality of turbine cables attached to the control vessel, wherein the turbine cables are attached to the turbine array for the purpose of stabilizing the turbine array; and
   a means to control the buoyancy of the control vessel to control the depth of the control vessel in a body of water and the depth of the turbine array.

2. The hydroelectric turbine assembly of claim 1, further comprising at least one turbine shroud attached to each turbine for the purpose of directing a greater volume of water through the turbine.

3. The hydroelectric turbine assembly of claim 2, wherein the shroud comprises a steel body filled with closed cell polystyrene foam.

4. The hydroelectric turbine assembly of claim 1, wherein the turbine cables form a substantially rigid structure when subjected to a hydraulic current so that the turbine cables substantially counteract twisting forces of spinning propellers of the turbines to reduce a twisting of the turbine cables and turbine array so to maximize power output of the turbines.

5. The hydroelectric turbine assembly of claim 1, wherein the turbines each comprise at least one propeller, the propeller capable of rotating for the purpose of generating electricity when subjected to a hydraulic current.

6. The hydroelectric turbine assembly of claim 4, wherein the turbine cables maintain substantially normal orientations of the turbines in relation to a direction of flow of the hydraulic current to maximize efficiency of the turbines.

7. The hydroelectric turbine assembly of claim 6, wherein the turbines each comprise a first and second propeller, the first propeller having a direction of rotation contrarotary to the second propeller, the first propeller being situated inline with the second propeller on substantially the same rotational axis.

8. The hydroelectric turbine assembly of claim 4, wherein the rotation of the propeller of each turbine is in a direction opposite the direction of rotation of a proximate turbine's propeller, reducing the twisting forces applied to the turbine cables and turbine array to maximize power output of the turbines.

9. The hydroelectric turbine assembly of claim 1, wherein the turbines are each about 20 meters to 40 meters in diameter.

10. The hydroelectric turbine assembly of claim 1, wherein the turbines are spaced apart from each other by about 120 meters to 475 meters.

11. The hydroelectric turbine assembly of claim 1, wherein the anchoring point is a driven pile.

12. The hydroelectric turbine assembly of claim 1, wherein the anchoring point is a suction caisson.

13. The hydroelectric turbine assembly of claim 1, wherein the anchoring point is a suction embedded plate anchor.

14. The hydroelectric turbine assembly of claim 1, wherein the mooring line is made from a buoyant synthetic line to avoid a catenary curvature in the mooring line.

15. The hydroelectric turbine assembly of claim 14, wherein the mooring line is made of ultra high molecular weight polyethylene.

16. A hydroelectric turbine installation, comprising:
    an anchoring point secured to a floor of an ocean having a current flow;
    a central control vessel having controllable buoyancy;
    a mooring line secured to the control vessel, the mooring line attached to the anchoring point;
    at least four turbine cables attached to the control vessel;
    a plurality of serially arranged turbines in communication with the turbine cables, the turbine cables maintaining the turbines at an angle substantially normal to the direction of the ocean's hydraulic current to minimize yaw and maximize power output of the turbines, the turbine cables forming a substantially rigid structure when subjected to the ocean's hydraulic current; and
    means to control the buoyancy of the control vessel to control the depth of the control vessel in a body of water and the depth of the turbine array, the turbine cables maintaining about the same depth of the turbine array.

17. A method of using a turbine array comprising the steps of:
    placing a control vessel in a body of water having a current flow;
    placing a plurality of serially arranged turbines in the body of water;
    attaching the plurality of serially arranged turbines to a plurality of cables;
    attaching the plurality of cables to a control vessel;
    maintaining the control vessel and the plurality of serially arranged turbines in the current flow by controlling the buoyancy of the control vessel;
    actuating the turbines using the current flow; and
    generating electricity from the actuation of the turbines.

* * * * *